July 3, 1928.  
E. F. PIERCE  
LUBRICANT COMPRESSOR  
Filed Oct. 17, 1925

1,675,424

Inventor  
Earl F. Pierce  
By Pierce and Sweet  
Attys.

Patented July 3, 1928.

1,675,424

UNITED STATES PATENT OFFICE.

EARL F. PIERCE, OF WINNETKA, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed October 17, 1925. Serial No. 63,081.

My invention relates to improvements in lubricant compressors and is particularly concerned with improvements in that type of lubricant compressor which is used for supplying lubricant under pressure to a plurality of fittings, the compressor including a coupling member for successively making sealed contact with the various fittings.

Compressors of the character described above are usually so constructed that the coupling member can be detached from the barrel portion of the compressor so as to permit the escape of air therefrom during the filling operation. In some cases, a flexible hose is interposed between the coupling member and the barrel, but with this construction, as well as with the construction in which the coupling member is directly secured to the barrel, the coupling member and the combined hose and coupling member are usually removed from the compressor barrels before the latter are filled.

One of the objects of my present invention is to provide a compressor of the character described, in which the coupling member or the flexible discharge conduit is connected to the compressor barrel in such manner that when it is removed from the compressor barrel during the filling operation the free discharge of air from the compressor barrel will occur with a minimum of obstruction.

Another object of my invention is to provide a lubricant compressor having a discharge conduit or coupling member connected therewith by a swivel connection, and in which a portion of the compressor barrel itself acts as one of the swivel members.

Another object is to provide a quick detachable connection that will not be disturbed by accidental rotation of the compressor barrel.

My invention further contemplates the provision of a lubricant compressor, such as described above, which is simple in construction, economical to manufacture and easy to operate.

Other objects of my invention will appear as this description progresses, reference being had to the accompanying drawings, in which Figure 1 is a side elevation, partially in longitudinal section, of a compressor embodying my improvements;

Figure 1:
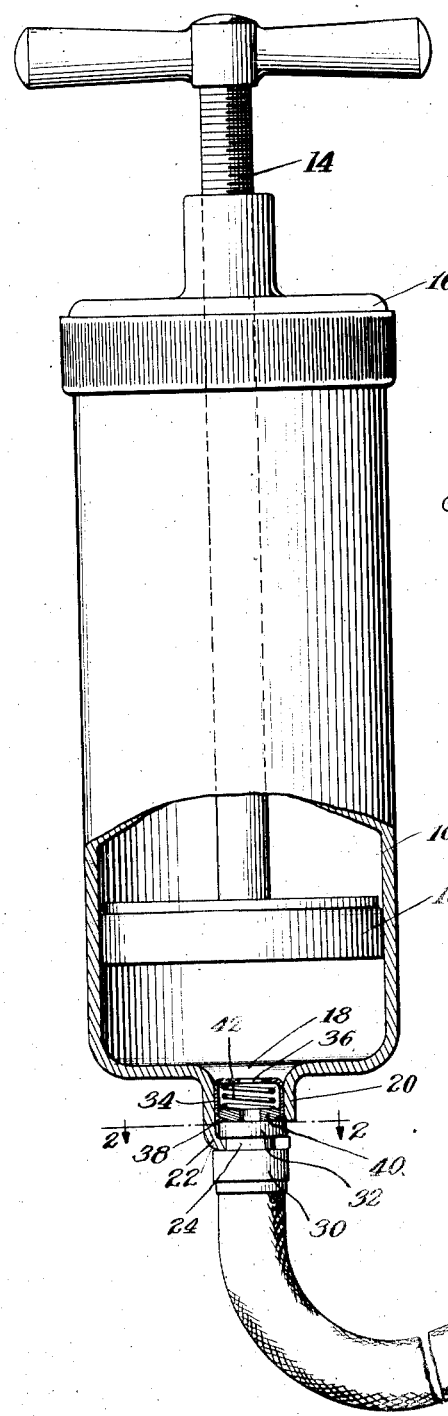
Figure 3:
Figure 3 is a side elevation of a plug.
Figure 2:
Figure 2 is a section on line 2—2 of Figure 1.

In the embodiment of the invention selected for illustration the compressor comprises the usual barrel 10 in which the piston 12 is reciprocated by suitable means, such as the screw-threaded piston rod 14 engaging threads in the removable cap 16.

At the discharge end the barrel is apertured at 18 and a short integral lip 20 surrounds the aperture defining an exit passage of less length than diameter. One side of this lip is extended at 22 and bent across opposite the aperture 18, terminating in a U-shaped retaining piece 24. The usual flexible tube 26, having the coupling 28 for attachment to the fitting on the parts to be lubricated, is, in this instance, provided with a special coupling 30 having a swivel member or head 32 adapted to slide between the retainer 24 and the aperture 18 to close the aperture.

In the aperture I provide sealing means in the form of a cup 34 having an inlet at 36 and a peripheral bead 38 to hold the edges of a flexible sealing washer 40 resiliently pressed outwardly by a spring 42. When pressure is developed by movement of the piston 12, the sealing washer 40 will be pressed tightly against the face of the head 32 and form a lubricant tight seal.

The head 32 is in turn pressed against the retainer 24 and the ends of the arms of said retainer are preferably provided with slight projections 44 which tend to hold the parts in place, but do not prevent free swiveling therebetween.

When the device is to be packed in small space it is desirable to detach the tube. To prevent loss of lubricant I provide a small solid plug 46 duplicating the outer contour of the coupling at the end of the conduit.

This application is a continuation in part of my co-pending application, Serial No. 708,007, filed April 21, 1924.

Without further elaboration, the foregoing will so fully explain the gist of my invention that others may, by applying current knowledge, readily adapt the same for use under various conditions of service, without eliminating certain features which may properly be said to constitute the essential items of novelty involved, which items are intended to be defined and secured to me by the following claims.

I claim:

1. Lubricating means comprising a barrel, a discharge conduit, a coupling in the barrel end of said conduit, said barrel having a discharge opening, laterally open hook means for receiving said coupling and holding it in sealing relation with said opening, and automatically operable means for positively retaining said coupling against removal while the lubricant is under pressure.

2. Lubricating means comprising a barrel having an annular flange at its discharge end, a slotted projection formed integrally and perpendicular to said flange and spaced from the end thereof, a cup having an inwardly extending brim fixed within said flange, an apertured sealing disc resiliently held against the inner surface of said brim, and a coupling having an enlarged head adapted to fit between said projection and said flange and having sealing contact with said disc.

3. Lubricating means comprising a barrel having an annular flange at its discharge end, a slotted projection perpendicular to and integral with said flange and spaced from the end thereof, an apertured cup secured within said flange so as to have its brim lie flush with the end thereof, an apertured sealing disc in said cup, a spring contained within said cup and tending to press said disc outwardly, and a flexible conduit having a coupling member with an enlarged head at one end, said head being adapted to be laterally inserted between said flange and said projection and in sealing contact with said disc.

In witness whereof, I hereunto subscribe my name, this 10th day of October, 1925.

EARL F. PIERCE.